(12) United States Patent
Yoon

(10) Patent No.: US 12,540,655 B2
(45) Date of Patent: Feb. 3, 2026

(54) SHACKLE

(71) Applicant: Rope Camp Co., Ltd., Busan (KR)

(72) Inventor: Chang Bin Yoon, Busan (KR)

(73) Assignee: Rope Camp Co., Ltd., Busan (KR)

( * ) Notice: Subject to any disclaimer, the term of this patent is extended or adjusted under 35 U.S.C. 154(b) by 269 days.

(21) Appl. No.: 18/317,609

(22) Filed: May 15, 2023

(65) Prior Publication Data

US 2024/0093759 A1 Mar. 21, 2024

(30) Foreign Application Priority Data

Sep. 21, 2022 (KR) .................. 20-2022-0002263

(51) Int. Cl.
*F16G 15/06* (2006.01)
(52) U.S. Cl.
CPC .................. *F16G 15/06* (2013.01)
(58) Field of Classification Search
CPC .. F16G 15/06; B66C 1/12; B66C 1/66; B66C 1/36
See application file for complete search history.

(56) References Cited

U.S. PATENT DOCUMENTS

| | | | | |
|---|---|---|---|---|
| 3,656,293 A * | 4/1972 | Lowery, Sr. | ............ | F16G 15/06 59/86 |
| 7,393,033 B1 * | 7/2008 | Bisso, IV | ................ | F16G 15/06 294/82.35 |
| 8,171,715 B2 * | 5/2012 | Segura | ................... | F16G 15/06 59/85 |
| 8,205,922 B1 * | 6/2012 | Ohman, Jr. | ............ | F16G 15/06 294/82.11 |

FOREIGN PATENT DOCUMENTS

| | | | | |
|---|---|---|---|---|
| DE | 19929392 A1 * | 1/2001 | ............ | F16G 15/06 |
| KR | 20-2013-0000554 U | 1/2013 | | |
| KR | 10-1785059 | 10/2017 | | |

OTHER PUBLICATIONS

English translate (DE19929392A1), retrieved date Mar. 26, 2025.*

* cited by examiner

*Primary Examiner* — Mohammed S. Alawadi
(74) *Attorney, Agent, or Firm* — Fish & Richardson P.C.

(57) ABSTRACT

The present invention provides a shackle, which includes: a shackle body formed in a bar shape bent so that opposite ends are adjacent to each other and face the same direction as each other, wherein the shackle body passes through a through hole formed in a loop at an end of a linear wire body; fastening rings provided at opposite ends of the shackle body, respectively, and having a penetration hole formed therein, wherein at least one of the fastening rings is detachably coupled to the shackle body; a first fastening means which passes through the penetration hole of the fastening ring to prevent the linear wire body from being separated from the shackle in a fastened state; and a second fastening means which is coupled with the first fastening means to prevent the linear wire body from being separated from the shackle together with the first fastening means.

7 Claims, 6 Drawing Sheets

SHACKLE

CROSS REFERENCE TO RELATED APPLICATIONS

This application claims priority to and benefit of Korean Utility Model Application No. 20-2022-0002263 filed on Sep. 21, 2022, the entirety of which is incorporated by reference herein.

BACKGROUND OF THE INVENTION

1. Field of the Invention

The present invention relates to a shackle.

2. Description of the Related Art

In general, a shackle refers to an auxiliary tool for hanging strings or wire ropes, and is a binding tool used to bind a lifting object with wire ropes, or to bind a wire rope and a hook of a crane. The shackle has a column shape with a predetermined thickness, and may be formed in a U shape so that opposite ends are bent to face the same direction as each other.

Fastening rings are provided at the opposite ends of the shackle, and the fastening rings are adjacent to each other at an interval so that a connection part of the lifting object may be sandwiched or interposed between a pair of fastening rings. In addition, since the shackle is manufactured by casting and a shackle body and the fastening rings are integrally formed with each other, it is usually formed in such a way that the fastening ring has a larger diameter than a thickness of the shackle body in consideration of the size and coupling force of a fastening means which is fastened and coupled to the connection part of the fastening ring and the lifting object.

However, when a through hole is formed in a loop as a closed geometrical figure, that is, a closed shape at an end of a linear wire body, it is usually difficult to insert and/or directly couple the shackle into/to the through hole, and in order to couple the loop-shaped end of the linear wire body with the shackle, components such as a hook or ring whose one end is open are additionally required.

PRIOR ART DOCUMENT

Patent Document (Patent Document 0001) Korean Patent Registration Publication No. 10-1785059

SUMMARY OF THE INVENTION

The present invention is intended to solve the above-described conventional problems, and it is an object of the present invention to provide a shackle capable of fastening and coupling various linear wire bodies regardless of the shape the linear wire body, thereby further increasing the utilization of the shackle.

To achieve the above object, according to an aspect of the present invention, there is provided a shackle including: a shackle body formed in a bar shape bent so that opposite ends are adjacent to each other and face the same direction as each other, wherein the shackle body passes through a through hole formed in a loop at an end of a linear wire body; fastening rings provided at opposite ends of the shackle body, respectively, and having a penetration hole formed therein, wherein at least one of the fastening rings is detachably coupled to the shackle body; a first fastening means which passes through the penetration hole of the fastening ring to prevent the linear wire body from being separated from the shackle in a fastened state; and a second fastening means which is coupled with the first fastening means to prevent the linear wire body from being separated from the shackle together with the first fastening means.

In the shackle according to an embodiment of the present invention, the shackle body may further include: a first screw thread formed on an outer circumferential surface of at least one end of the opposite ends of the shackle body, to which the fastening ring is detachably coupled; and a cap having a second screw thread corresponding to the first screw thread, which is formed on an inner surface thereof to be screwed with the one end of the opposite ends, wherein the cap prevents damage through friction with the linear wire body while passing through the through hole.

In the shackle according to an embodiment of the present invention, the fastening ring may be formed to have a larger diameter than a thickness of the shackle body.

In the shackle according to an embodiment of the present invention, the penetration hole of the fastening ring may be formed to have a larger diameter than the thickness of the shackle body.

In the shackle according to an embodiment of the present invention, the fastening ring may have a stopped portion formed in a multiple stage inside thereof so that the first fastening means or the second fastening means is seated.

In the shackle according to an embodiment of the present invention, the fastening ring and the first fastening means or the second fastening means may be disposed on a virtual plane so that outer surfaces thereof are flush with each other.

In the shackle according to an embodiment of the present invention, the first fastening means and the second fastening means may be a bolt and a nut, respectively.

In accordance with the shackle according to the present invention, it is possible to fasten and couple various linear wire bodies regardless of the shape of the linear wire body, such that it may be applied to various structures in a variety of situations.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
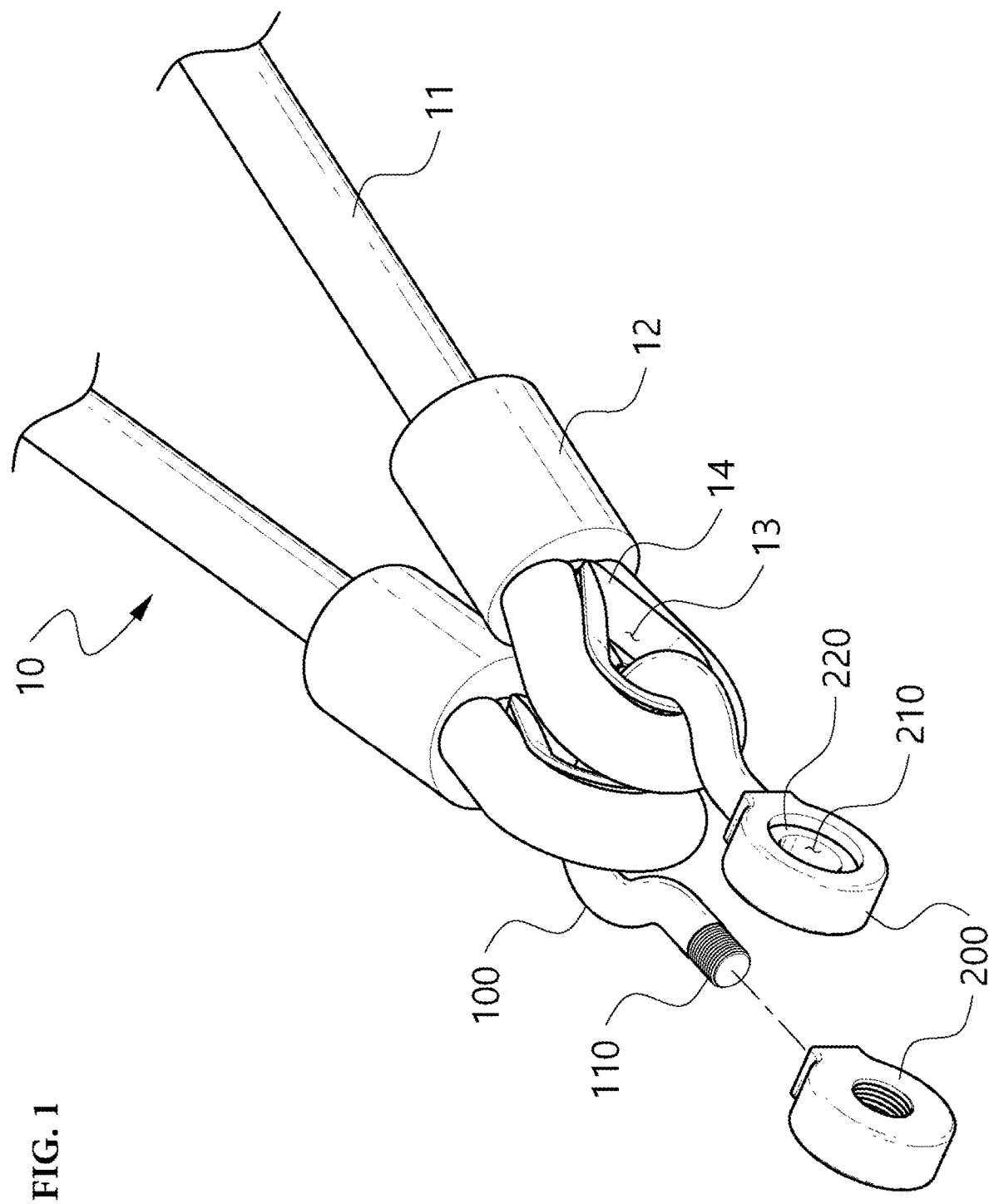
FIG. 1 is a perspective view illustrating a use state of a shackle according to an embodiment of the present invention.

Hereinafter, some embodiments of the present invention will be described in detail with reference to the accompanying drawings. In denoting reference numerals to components of respective drawings, it should be noted that the same components will be denoted by the same reference numerals although they are illustrated in different drawings. Further, in description of the embodiments of the present invention, the publicly known functions and configurations related to the present invention, which are judged to be able to make the purport of the present invention unnecessarily obscure, will not be described in detail.

In addition, in describing components of the present invention, the terms first, second, A, B, (a), (b), and the like, may be used. These terms are intended to distinguish the components from other components, and do not limit the nature, sequence or order of the components. It will be understood that when a component is described to as being "connected", "combined" or "coupled" to another component, the component may be directly connected or coupled the another component, but it may be "connected", "combined" or "coupled" to the another component intervening another component may be present.

Hereinafter, a shackle according to an embodiment of the present invention will be described with reference to the accompanying drawings.

Figure 2:
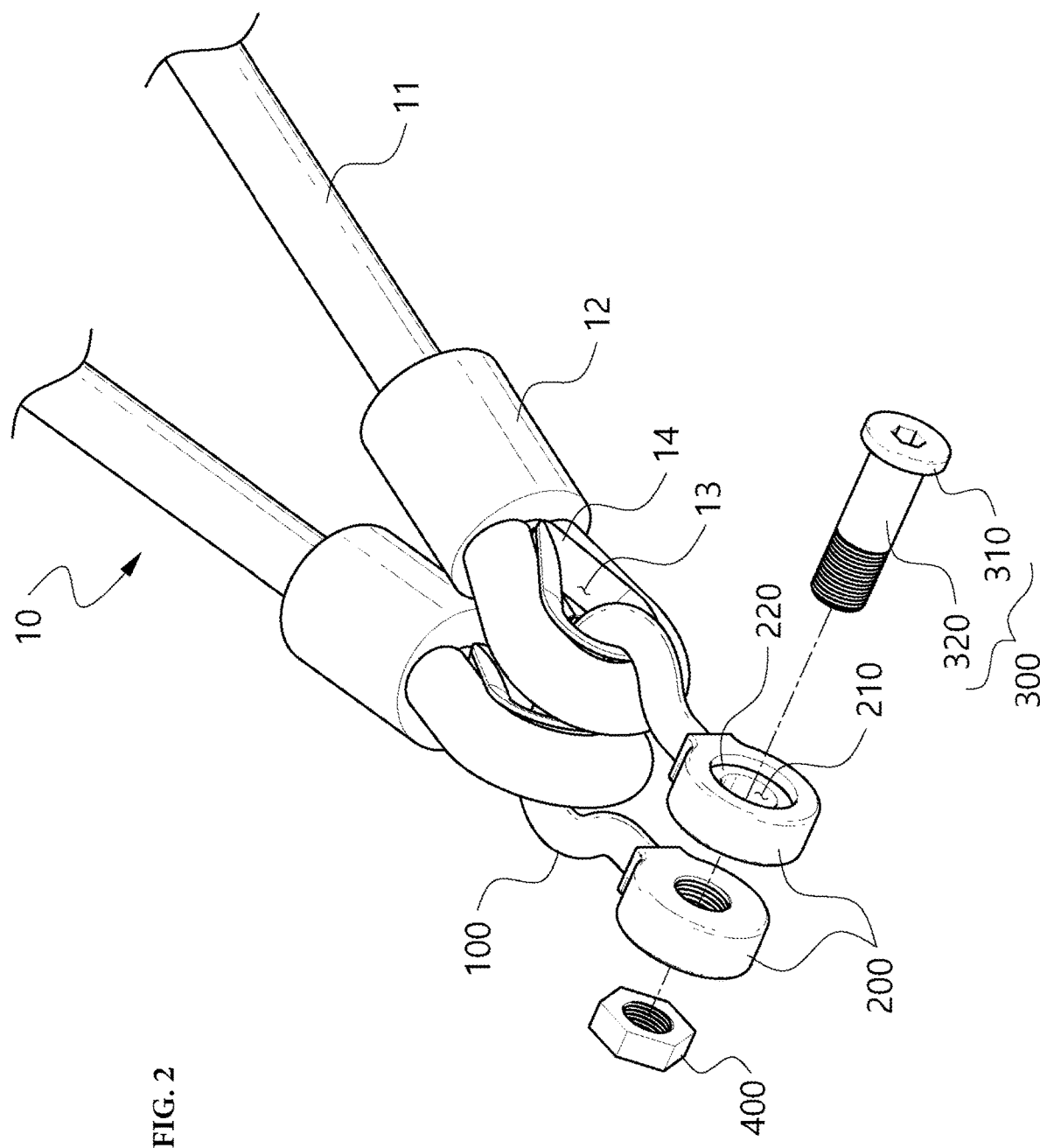
FIG. 2 is a perspective view illustrating first and second fastening means provided in the shackle shown in FIG. 1.
Figure 3:
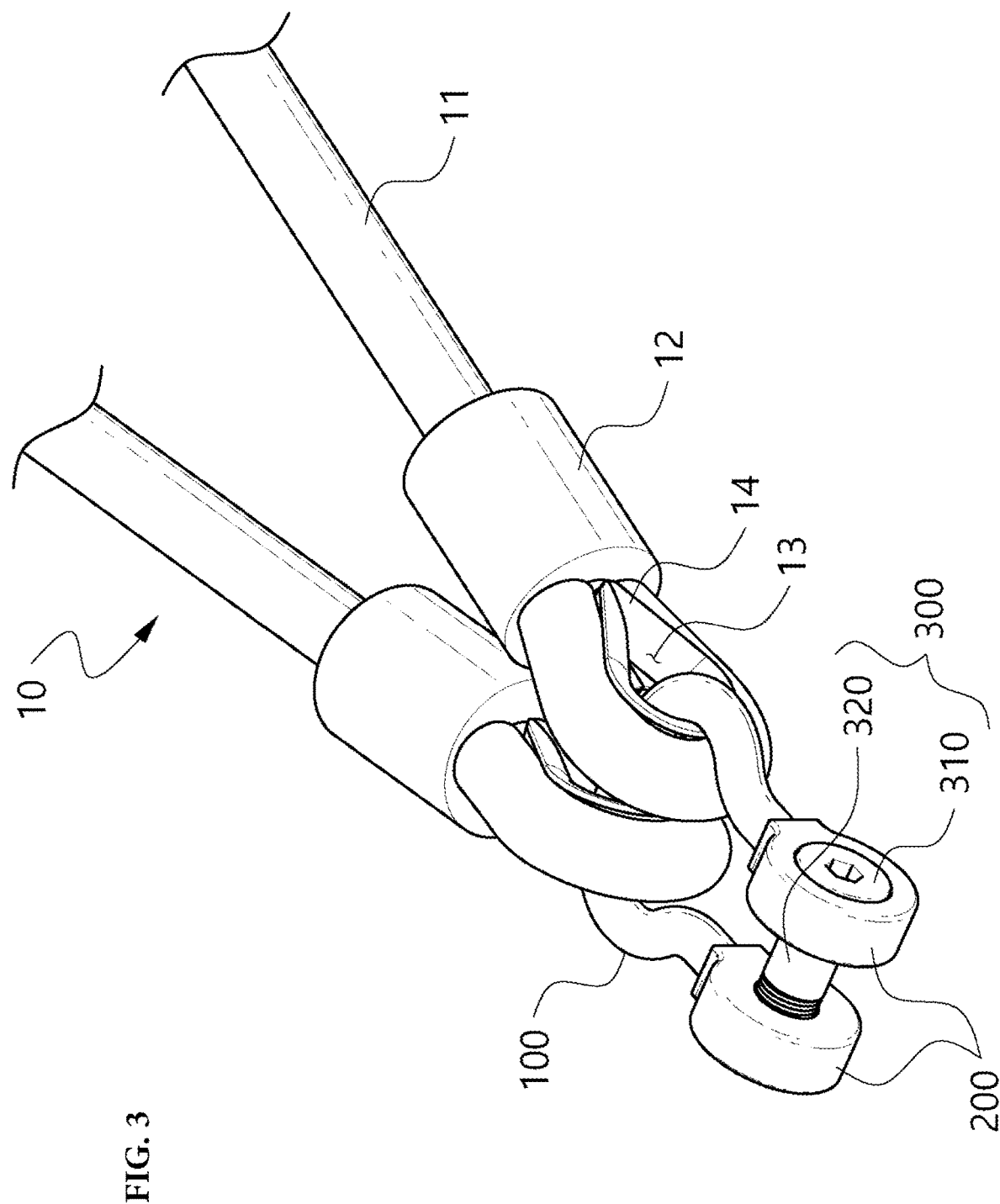
FIG. 3 is a perspective view illustrating a state in which the first and second fastening means are coupled with each other in the shackle shown in FIG. 1.
Figure 4:
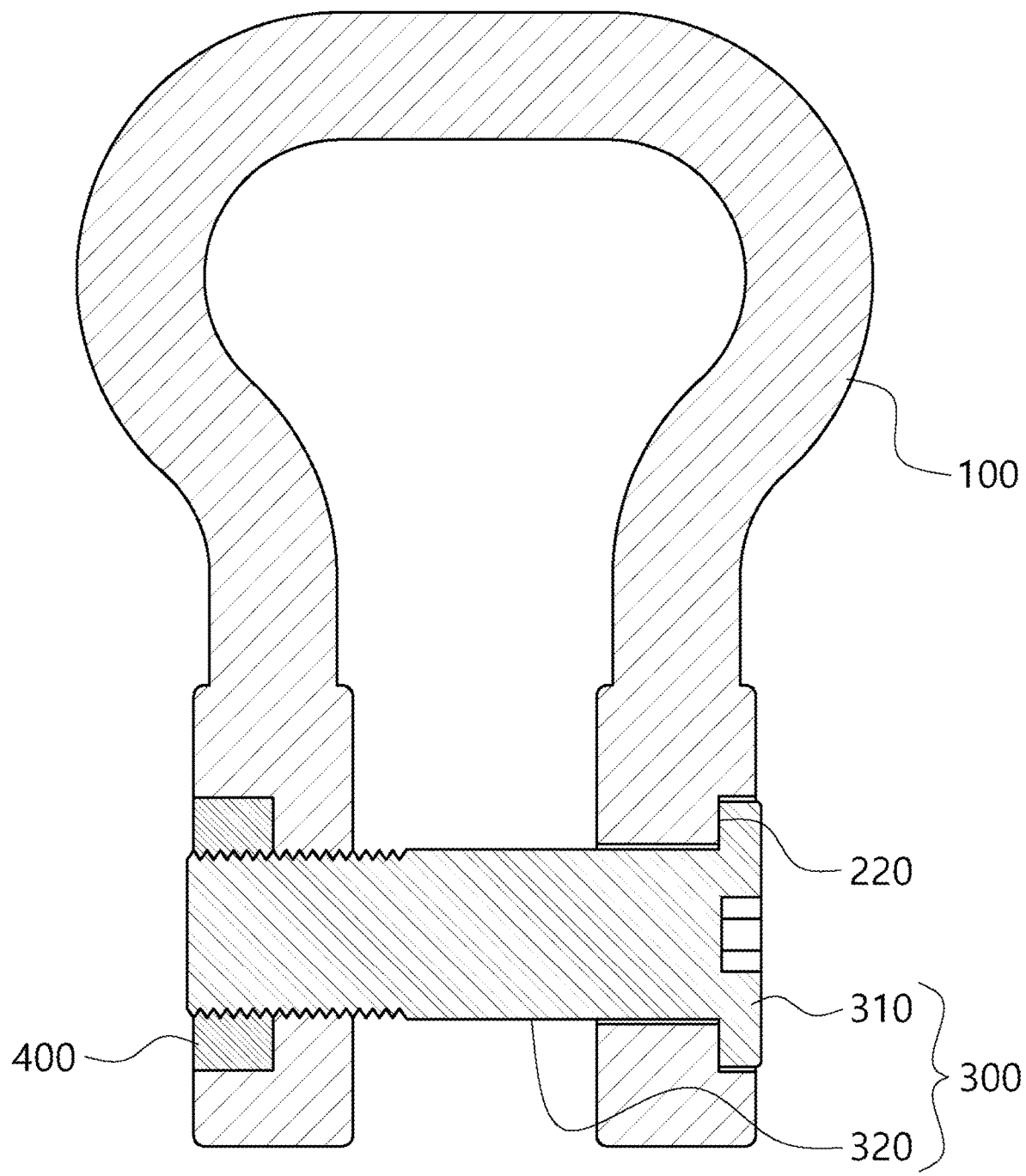
FIG. 4 is a cross-sectional plan view illustrating the shackle according to an embodiment of the present invention.
Figure 5:
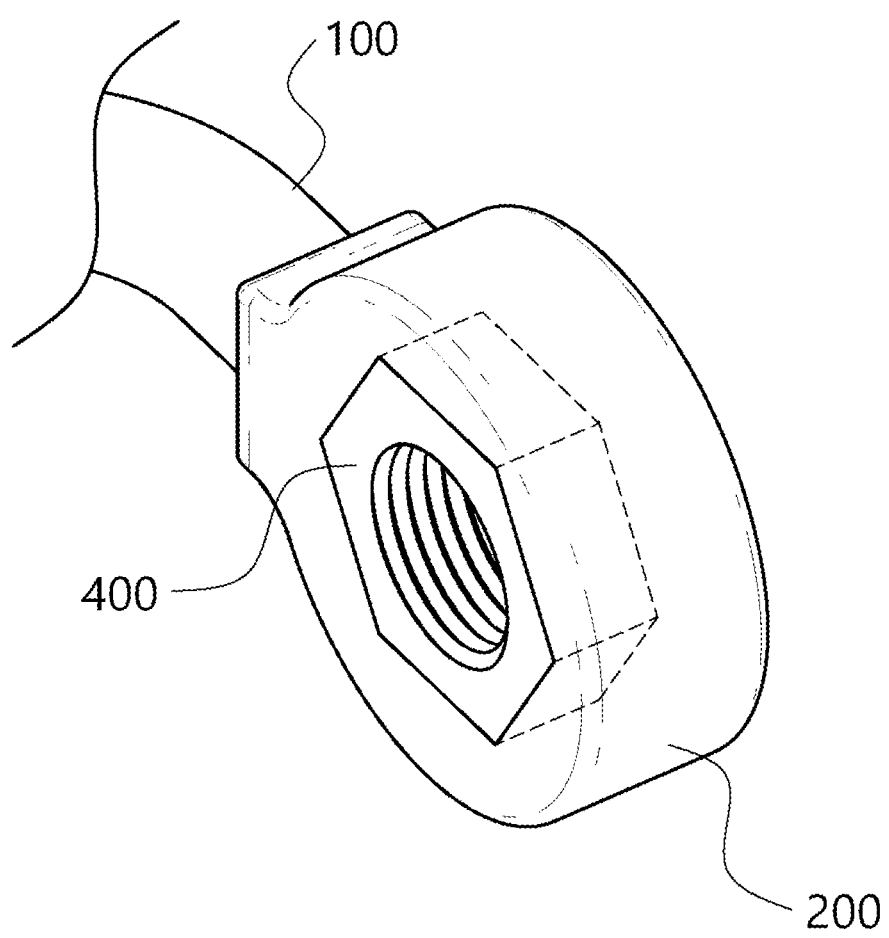
FIG. 5 is an enlarged perspective view of a portion extracted from FIG. 4.
Figure 6A:
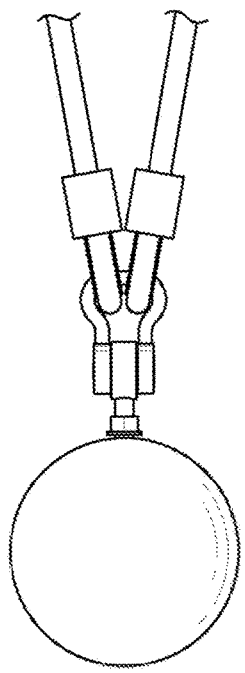
FIGS. 6A to 6C are plan views illustrating states in which the shackles according to an embodiment of the present invention are applied in various ways according to the number of ropes.
Figure 6B:
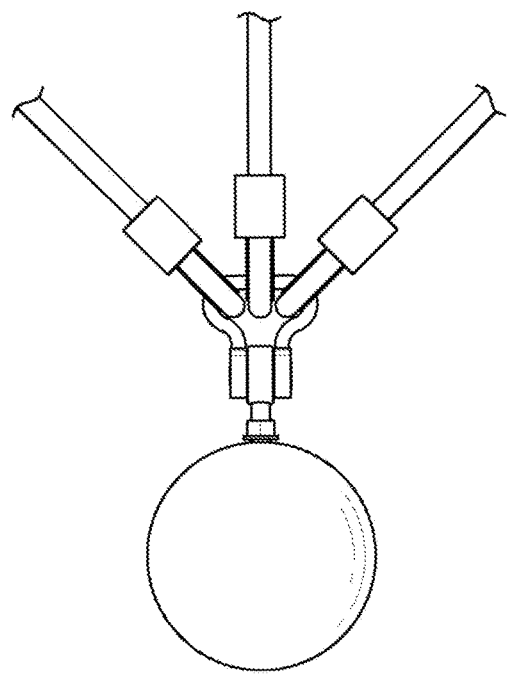
Figure 6C:
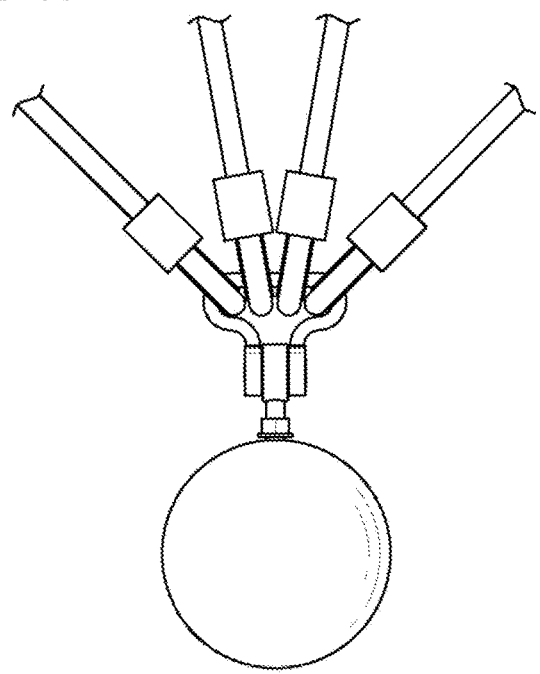

FIG. 1 is a perspective view illustrating a use state of a shackle according to an embodiment of the present invention, FIG. 2 is a perspective view illustrating first and second fastening means provided in the shackle shown in FIG. 1, FIG. 3 is a perspective view illustrating a state in which the first and second fastening means are coupled with each other in the shackle shown in FIG. 1, FIG. 4 is a cross-sectional plan view illustrating the shackle according to an embodiment of the present invention, FIG. 5 is an enlarged perspective view of a portion extracted from FIG. 4; and FIGS. 6A to 6C are plan views illustrating states in which the shackles according to an embodiment of the present invention are applied in various ways according to the number of ropes.

Referring to FIGS. 1 to 6, the shackle according to an embodiment of the present invention may include a shackle body 100, fastening rings 200, a first fastening means 300 and a second fastening means 400.

An aspect of the present invention relates to a shackle on which linear wire bodies 10 respectively having a closed circle at an end formed in a loop can be hung, unlike a conventional shackle required a separate component such as a hook whose one end is open, which enables a linear wire body having a loop-shaped end to be hung on the shackle body 100.

The linear wire body 10 may be formed as a rope 11. An end of the linear wire body 10 may be coupled to any portion of the linear wire body 10 so as to form a closed shape. In detail, a binding sleeve 12 is provided on a portion of the linear wire body 10, a portion of the linear wire body 10 penetrates the binding sleeve 12, and the end of the linear wire body 10 is bound to the binding sleeve 12, so that the linear wire body 10 may form a closed shape, that is, a loop.

A thimble 14 may be provided on an inner surface of the linear wire body 10, which preserves the shape of the loop. The thimble 14 may be made of a material having a hard property that can be provided in a form of a predetermined size, and may have a through hole 13 formed therein. The linear wire body 10 surrounds an outer surface of the thimble 14, and the end of the linear wire body 10 is bound to the binding sleeve 12, such that it is possible to prevent the thimble 14 from being separated therefrom to an outside due to a pressure by which the linear wire body 10 is bound. In the present invention, a configuration, in which the linear wire body 10 includes the rope 11, the binding sleeve 12, the through hole 13 and the thimble 14, has been described as an example, but this is only one embodiment and it is not limited thereto. Of course, any one may be used so long as a through hole can be formed through which the shackle body 100 passes.

The shackle body 100 may be formed as a columnar body having a predetermined thickness. The shackle body 100 may have a bar shape bent so that opposite ends are adjacent to each other and face the same direction as each other. The shackle body 100 may pass through the through hole 13 of the linear wire body 10.

The shackle body 100 may include a first screw thread (not shown) and a cap 110.

The shackle body 100 may be provided with fastening rings 200, which will be described below, at opposite ends, respectively, and at least one of a pair of fastening rings 200 may be detachably coupled to the shackle body 100. At this time, the first screw thread may be formed on an outer circumferential surface of one end of the opposite ends of the shackle body 100, to which the fastening ring 200 is detachably coupled.

The cap 110 may be covered on the outer circumferential surface of one end of the opposite ends of the shackle body 100, to which the fastening ring 200 is detachably coupled, and may protect the one end of the shackle body 100 when the shackle body 100 and the fastening ring 200 are not coupled. The cap 110 may have a second screw thread (not shown) corresponding to the first screw thread, which is formed on an inner surface thereof, such that the one end of the shackle body 100 and the cap 110 may be screwed with each other.

In addition, the cap 110 may prevent the first screw thread of the shackle body 100 from colliding with the thimble 14 when the shackle body 100 passes through the through hole 13 according to the user's intention. Further, the cap 110 may prevent frictional contact between the first screw thread and the rope 11, thereby preventing the first screw thread and the rope 11 from being damaged.

The fastening rings 200 may be provided at opposite ends of the shackle body 100, respectively. The pair of fastening rings 200 are provided to face each other, and a connection part (without reference numeral) which is connected with a lifting object may be disposed between the pair of fastening rings 200, thus to be fastened and coupled by the first and second fastening means 300 and 400, which will be described below (see FIG. 4). In the drawings, a configuration, in which the pair of fastening rings 200 are provided and one of them may be detachably coupled to the shackle body 100, has been illustrated, but both of the pair of fastening rings 200 may be detachably coupled the shackle body 100 according to the manufacturer's intention.

Commonly, in the conventional shackle, the shackle body 100 and the fastening ring 200 are integrally formed with each other, but this conventional shackle cannot pass through the through hole 13 of the linear wire body 10 having a loop-shaped end due to the size thereof. To solve this problem, the shackle according to an embodiment of the present invention is characterized in that the shackle body 100 and the fastening ring 200 are configured to be separated from each other.

The fastening ring 200 may be formed to have a larger outermost diameter than a thickness of the shackle body 100, thereby preventing the linear wire body 10 from being separated from the shackle body 100. In addition, the fastening ring 200 may have a penetration hole 210 formed therein to have a larger diameter than the thickness of the shackle body 100.

Meanwhile, the fastening ring 200 may be formed to have a small size so as to pass through the through hole 13 of the linear wire body 10, but in this case, the sizes of the connection part which is connected to the lifting object and the first and second fastening means 300 and 400 should be reduced, such that a binding force connected to the lifting object may be weakened.

The fastening ring 200 may have a stepped portion 220 formed in a multiple stage inside thereof forming the penetration hole 210 so that the first fastening means 300 or the second fastening means 400, which will be described below, are seated.

The first fastening means 300 may pass through the penetration hole 210 of the fastening ring 200.

The second fastening means 400 may be coupled with an end of the first fastening means 300 passing through the penetration hole 210 of the fastening ring 200.

The first fastening means 300 and the second fastening means 400 are be coupled with each other to prevent the linear wire body 10 from being separated from the shackle body 100 in a fastened state.

The first fastening means 300 and the second fastening means 400 may be provided as a bolt and a nut, respectively. For example, the first fastening means 300 may include a bolt shank 310 and a bolt head 320, wherein the bolt shank 310 may pass through the penetration hole 210 of the fastening ring 200, and the bolt head 320 may be caught by the stepped portion 220, thereby preventing the first fastening means 300 from completely passing through the penetration hole 210.

At this time, the fastening ring 200 and the bolt head 320 may share the same virtual plane, that is, may be disposed on a virtual plane so that outer surfaces thereof are flush with each other, and in addition, the fastening ring 200 and the second fastening means 400 may also share the same virtual plane. Therefore, since the first and second fastening means 300 and 400 do not protrude to an outside of the fastening ring 200, interference with other external components or objects may be prevented.

In addition, the shackle according to the present invention may be applied in various ways according to the number of ropes. That is, as shown in FIGS. 6A to 6C, a plurality of ropes, such as two, three and four ropes may be bound by the shackle of the present invention depending on the various field situations.

While the present invention has been described with reference to the preferred embodiments for implementing the shackle, the present invention is not limited to the above-described embodiments, and it will be understood by those skilled in the related art that various modifications and variations may be made therein without departing from the scope of the present invention as defined by the appended claims, as well as these modifications and variations should be included in the scope of the technical spirit of the present invention.

DESCRIPTION OF REFERENCE NUMERALS

10: Linear wire body
11: Rope
12: Binding sleeve
13: Through hole
14: Thimble
100: Shackle body
110: Cap
200: Fastening ring
210: Penetration hole
220: Stepped portion
300: First fastening means
310: Bolt shank
320: Bolt head
400: Second fastening means

What is claimed is:

1. A shackle comprising:
a shackle body having opposite ends;
wherein the shackle body formed in a bar shape bent so that the opposite ends are adjacent to each other and face a common direction as each other, wherein the shackle body passes through a through hole formed in a loop at an end of a linear wire body;
fastening rings provided at the opposite ends of the shackle body, respectively, and each of the fastening rings having a penetration hole formed therein, wherein at least one of the fastening rings is detachably coupled to the shackle body;
a first fastening means which passes through the penetration hole to prevent the linear wire body from being separated from the shackle in a fastened state; and
a second fastening means which is coupled with the first fastening means to prevent the linear wire body from being separated from the shackle together with the first fastening means.

2. The shackle according to claim 1, wherein the shackle body further comprises:
a first screw thread formed on an outer circumferential surface of at least one end of the opposite ends of the shackle body, to which the at least one of the fastening rings is detachably coupled; and
a cap having a second screw thread corresponding to the first screw thread, which is formed on an inner surface thereof to be screwed with the one end of the opposite ends, wherein the cap prevents damage through friction with the linear wire body while passing through the through hole.

3. The shackle according to claim 1, wherein each of the fastening rings is formed to have a larger diameter than a thickness of the shackle body.

4. The shackle according to claim 1, wherein the penetration hole is formed to have a larger diameter than the thickness of the shackle body.

5. The shackle according to claim 1, wherein each of the fastening rings has a stopped portion formed in a multiple stage inside thereof so that the first fastening means or the second fastening means is seated.

6. The shackle according to claim 1, wherein the fastening ring and the first fastening means or the second fastening means are disposed on a virtual plane so that an outer surface of the fastening ring and an outer surface of either the first fastening means or the second fastening means are flush with each other.

7. The shackle according to claim 1, wherein the first fastening means and the second fastening means are a bolt and a nut, respectively.

* * * * *